Patented May 18, 1943

2,319,362

UNITED STATES PATENT OFFICE 2,319,362

PROCESS FOR THE PRODUCTION OF SOLID MILK PRODUCTS

Otto John Wouters, Zwolle, Netherlands; vested in the Alien Property Custodian

No Drawing. Application April 25, 1939, Serial No. 270,017. In Germany October 7, 1938

10 Claims. (Cl. 99—56)

This invention relates to the production of solid milk products by evaporating sugared milk, and more particularly to the production of so-called block milk and products produced therefrom, such as milk powder and the like.

It is known that milk products, particularly milk powder, undergo a deterioration of taste—generally resulting in a so-called tallowy taste—when stored for a long period in the dry state or when subjected to the action of elevated temperatures.

It is the aim of the present invention to provide a process which eliminates these disadvantages, which are probably due to the formation of oxy-fatty acids from unsaturated fatty acids, by the action of air (oxygen). Exhaustive tests have shown that this undesirable oxidation can only take place when a determined oxygen pressure (oxygen concentration) exists, or that the oxidation occurs only when a determined oxygen potential is attained.

Further tests have shown that it is actually possible to eliminate, practically completely or to a very large extent, the deterioration of taste of milk products due to the effects of oxidation, by incorporating in the milk or the products formed therefrom substances which are able to reduce the so-called redox potential to a value at which oxidation of the milk fat is prevented or checked. It has been found that for this purpose depression of potential of about 30 to 50 mv. are usually sufficient.

Those reducing substances which are able to reduce the redox potential by about 30 to 50 mv. are fundamentally suitable for the successful performance of the present process. A very large majority of such substances, however, would have to be eliminated in practice for reasons of hygiene or taste. The principal substances suitable for reducing the redox potential are reducing sugars, preferably monoses. Since not all types of reducing sugar are able to effect the necessary depression of potential, it is advisable to ascertain suitability by means of preliminary tests. Glucose, which should be the substance mainly used in practice, has given excellent results. It is advisable to use pure anhydrous glucose.

The amount of the reducing substance, for instance glucose, is to be so proportioned that the desired effect (prevention of the oxidation of unsaturated fatty acids) is achieved. In the production of sugar-containing milk products, such as block milk and milk powder produced therefrom, from milk sweetened with cane sugar (saccharose), it has been found that adequate protection of the unsaturated fat is obtained if about 1 part by weight of pure anhydrous glucose be added to each 3 parts by weight of milk fat. In addition, the amounts of the substance reducing the redox potential which are best suited in various cases can be determined from case to case by means of preliminary tests.

In carrying the process of the invention into practical effect, it is possible to proceed, for example, by evaporating milk, or milk enriched with milk fat (cream), in vacuo, adding cane sugar and a substance reducing the redox potential to an adequate extent, such as glucose, until plastic masses are formed, converting the latter into solid products by allowing them to cool, and further working up said solid products, if desired, into pulverulent milk products by comminution.

The amount of the total sugar to be incorporated in the milk can vary within extensive limits, for example in such a manner that the sugar content of the evaporated product (so-called block milk) amounts to about 30 to 70%. As a rule it has been found advantageous to aim at evaporated products having total sugar contents of about 40 to 50%, preferably from 45 to 50%, while the content of reducing sugar, preferably glucose, can amount to about 10 to 15%, preferably about 10% of the total sugar. Such evaporated products possess very good properties and furnish milk products, including, in particular, milk powder, which are distinguished by very great durability, and in addition, possess relatively good solubility. Additions of sugar, for example those which furnish evaporated products having sugar contents of about 50 to 70%, promote the hardening of the masses or of the blocks produced therefrom, and facilitate their conversion into milk powder. The production of such products high in sugar, however, is generally only required for special purposes.

It has further been found that the durability of the products can be still further improved by preventing contact with metals which are adapted to accelerate catalytically the oxidation of the milk fat, such as copper, iron and the like. It is consequently advisable not to bring the milk and the products of further working up into contact (particularly during the evaporating process) with apparatus or apparatus parts which consist entirely or partly of catalytically active metals. Apparatus of high-alloy, non-rusting steels, for example those containing about 18% of nickel and about 8% of chromium, have been found utilisable. In addition, enamelled apparatus can be used, for preference those the enamels of which are free from metals having a catalytic action. Finally, the apparatus may also be protected by coatings of noble metals, or, for example, also of aluminium.

The solubility of the products may further be improved, according to the present invention, by taking care that the ability of the milk proteins (albumen) to swell is maintained or increased. This can be done, for example, by effecting moderate displacements of equilibrium between anions and cations towards the alkaline side, but without attaining alkalinity. The stabilisation of the serum equilibrium is effected, according to the invention, by buffering with the aid of weakly alkaline salts, preferably those the ions of which are already present in the milk serum, such as secondary sodium phosphate, sodium citrate, sodium-ammonium phosphate and the like. As a rule, slight additions of such compounds, for example 0.01 to 0.02%, are sufficient. In all cases care must be taken that the pH value does not exceed 7 and is preferably kept lower, adjustment to a value of about 6.3 being found best. By operating in this manner, products are obtained—particularly milk powder—which are distinguished not only by excellent durability but also by splendid solubility in water and aqueous liquids. The good solubility is maintained even when stored for long periods.

*Example I*

3600 kgs. of preferably pasteurised whole milk having a fat content of 2.9% are adjusted to a pH value of 6.3 with a mixture of disodium phosphate and trisodium citrate. 306 kgs. of cane sugar and 36 kgs. of anhydrous glucose are added to the milk, and the mixture evaporated in vacuo in the usual manner, the temperatures (particularly in the later stages of the evaporation) being kept as low as possible, preferably below 50° C., and the operation being accompanied, at least in the last stage, by good stirring and preventing the product from adhering to the walls of the vessel. The dehydration can be carried out, for example, down to water contents of about 6 to 15, preferably 8 to 12%. The evaporated products, which are still quite plastic in the warm, are advantageously converted immediately after removal from the vacuum into moulded shapes, such as blocks, and the latter are allowed to set. The blocks may be protected in known manner by the application of protective layers, for example of cocoa butter.

The evaporated products produced in accordance with the present invention, for instance blocks, such as are produced in accordance with Example I, may be converted by comminution into milk powder of excellent properties. The comminution of the masses or blocks presents certain difficulties, however, which are mainly due to the fact that the mass readily becomes sticky during comminution and clogs or stops up the machines, and that the good properties of the products are impaired. Ordinary mills have been found useless for carrying out the comminution operation, while it was found just as difficult to carry out useful comminution with rasps and similar apparatus.

It has been found that it is essential to avoid as far as possible heating of the mass during comminution. Exhaustive tests have shown that the conversion of the evaporated products into milk powder is possible, while avoiding detrimental heating, by carrying out the comminution by means of discs designed after the style of millers.

For example, the comminution can be carried out in such a manner that particles of a mean diameter of about 0.5 mm. are obtained, i. e. particles passing through standard 20 but not through standard 30 screens (standards of the German Standards Committee). Since the particles formed by comminution have a great tendency to conglomerate again even under light pressure, it is advisable to convey them without pressure, i. e. to allow them to fall freely from the grinding apparatus into the drying chamber, or to introduce the particles into the drying chamber and/or pass them through the latter by gas conveyance, preferably with the aid of inert gases. The grinding and drying can also advantageously be carried out with the aid of evacuation, for example by sucking the particles, formed in vacuo by comminution of the milk mass, directly into and/or through the drying chamber.

The drying process can be carried out in such a manner as to preserve the products from injury, by avoiding too high temperatures and too long a drying time. Too high temperatures, for example those exceeding about 80°, may impair the solubility of the product. When the drying operation is too protracted, fat may be liberated and the durability of the powder may be reduced. Drying temperatures of about 50° may, for example, be utilised with advantage and the drying can be completed in a space of time not exceeding about 30 minutes. The milk powder is advantageously dried to water contents of below 2%, for example 1 to 1.5%. The resulting milk powder is preferably packed in airtight containers.

The invention permits the production of milk powders which possess solubility just as good as, or still better than that of known, well soluble milk powders produced by atomisation, but which by far surpass the latter in respect of durability and possess considerably better durability than the roller milk powders which are known to possess good durability, while considerably excelling the latter in respect of solubility.

Milk powders high in sugar, produced according to the present invention, are particularly suitable, inter alia, for the production of products for further working up. Thus, for example, by mixing the milk powder with constituents of pudding powders, oat flakes and the like, products can be produced which are excellently suitable for the direct preparation of puddings, oat foods and the like and contain, in addition to the other constituents, milk in a very durable, readily soluble form, together with the necessary sugar content. If desired, milk powder with particularly high sugar contents can be employed for this purpose, and the addition of sugar otherwise customary for pudding powders and similar products may be accordingly reduced. Further fields of utility are in the production of mixtures with coffee, coffee extracts, cocoa extracts and the like for the direct preparation of milk coffee, milk cocoa and the like.

According to one embodiment of the invention, the procedure is to introduce the added substances, such as oat flakes, pudding powder constituents and the like, wholly or in part, into the evaporation process of the milk. In this case the added substances are introduced into the vacuum vessel towards the end of the evaporation of the sweetened milk, for example at a stage in which the warm evaporated product constitutes a mass still well mixable in the warm. It is then easily possible to distribute the added substances evenly in the warm milk mass, varying for example from a syrupy to a dough-like consistency, with the aid of the stirring mechanism, and to obtain particularly intimate permeation, for example by the absorption of liquid from the milk mass into the added substances, or the passing of soluble constituents of the added substances into the milk mass, and so on. In this case also the milk mass mixed with added substances is preferably withdrawn from the vacuum while still in a plastic state, converted into moulded shapes, such as blocks, and the latter are caused to set by being left to cool. Here again the moulded shapes, if they are to be stored for a long time or despatched in that form, may if desired, be protected by protective coatings. By comminution of the solidified evaporated masses, or of the blocks produced therefrom, pulverulent products may be obtained which contain all the constituents and possess considerable advantages over mixtures of the separately produced milk powder with the other constituents. The comminution may in this case also be carried out with the aid of miller-like discs. Very homogeneous products, which are practically incapable of separation into their component parts during storage, are obtained.

*Example II*

3600 kgs. of whole milk are evaporated, with the addition of cane sugar and glucose, as described in Example I. When the dehydration has proceeded to a water content of about 20%, 200 kgs. of oat flakes are added, whereupon the mass bubbles up vigorously and the concentration operation is continued with stirring. In a short time the mass has been dehydrated down to a water content of about 8%. The mass, which is still quite plastic in the warm, is thereupon removed from the vacuum and converted into moulded shapes, the latter being allowed to cool and, if they are to be stored for a long time or despatched, coated with protective layers. By grinding the blocks, for example with the aid of miller-like discs, and drying the resulting powder to water contents of about 1 to 2%, durable pulverulent products are obtained which contain all the constituents for preparing milk-containing oat foods and which can be converted into such by simple treatment with hot water.

I claim:

1. Process for the manufacture of milk powder from milk containing its natural milk fat, which comprises adding to the milk cane sugar and glucose, the amount by weight of glucose so added being at least one-third the amount of milk fat present in the milk and the total amount of sugars added being equivalent to from about 30% to about 70% by weight of the total finished mixture, evaporating the mixture in vacuum until a mass capable of being molded in heat and containing from about 6 to about 15% of water is formed, solidifying the mass by cooling, comminuting the solidified mass, and converting the resulting particles by drying at a temperature not exceeding about 80° C. and in the absence of substantial compression of the particles into a powdery product containing not materially more than 2% of water.

2. Process according to claim 1, in which the glucose used is a pure anhydrous glucose.

3. Process according to claim 1, in which a small amount of a slightly alkaline substance is added to the milk to be evaporated, in addition to cane sugar and glucose, the addition of slightly alkaline substance being so controlled as to yield a mixture whose pH value does not exceed 7.

4. Process according to claim 1, in which a small amount of a slightly alkaline substance occurring naturally in milk serum is added to the milk to be evaporated, the addition being so measured that the pH value of the mixture is adjusted to from about 6.3 to not more than 7.

5. Process according to claim 1, in which as the solidified mass is comminuted the particles freely fall into a drying zone.

6. Process according to claim 1, in which the particles resulting from the comminution of the solidified mass are brought by gas conveyance into a drying zone.

7. Process according to claim 1, in which both the comminuting of the products of evaporation and likewise the drying of the particles obtained thereby are carried out in vacuum.

8. Powdered milk product, containing the solids of natural milk, cane sugar and glucose protecting the milk fat from oxidation, the glucose amounting to at least one-third the content of milk fat present but while being less than the amount of added cane sugar and the total amount of the added sugars amounting to about 30–70% of the total product.

9. Process for the manufacture of milk powder from milk containing its natural milk fat, which comprises adding to the fluid milk cane sugar and a harmless reducing sugar capable of reducing the redox potential by about from 30 to 50 m. v., the amount of reducing sugar so added being sufficient for protecting the milk fat content of the milk against oxidation both during the processing of the product and in the finished product and in general in an amount by weight at least equal to one-third the weight of the milk fat, the total amount of cane sugar and reducing sugar being equivalent to from about 30% to about 70% by weight of the total finished mixture, evaporating the mixture in vacuum until a mass capable of being molded in heat and containing from about 6 to about 15% of water is formed, solidifying the mass by cooling, comminuting the solidified mass, and converting the resulting particles by drying at a temperature not exceeding about 80° C. and in the absence of substantial compression of the particles into a powdery product containing not materially more than 2% of water.

10. A milk fat-containing milk powder mixture consisting essentially of the solids of normal milk, cane sugar and an edible reducing sugar capable of lowering the redox potential to about 30 to 50 m. v., the reducing sugar being present in an amount by weight at least equal to one-third the amount of milk fat present, and the sum of the added sugars being from about 30% to about 70% by weight of the total finished mixture, characterized in that the individual particles of the powder mixture contain the milk solids and the added sugars in intimate state of division.

OTTO JOHN WOUTERS.